United States Patent
Ehrmantraut et al.

(10) Patent No.: US 7,873,444 B1
(45) Date of Patent: Jan. 18, 2011

(54) CONTROLLING MOVEMENT OF AN UNMANNED VEHICLE

(75) Inventors: Adam S. Ehrmantraut, Rosemount, MN (US); Hieu D. Pham, Blaine, MN (US)

(73) Assignee: Lockheed Martin Corporation, Bethesda, MD (US)

( * ) Notice: Subject to any disclaimer, the term of this patent is extended or adjusted under 35 U.S.C. 154(b) by 1163 days.

(21) Appl. No.: 11/704,030

(22) Filed: Feb. 8, 2007

(51) Int. Cl.
*G06F 19/00* (2006.01)
*B64C 27/00* (2006.01)

(52) U.S. Cl. .......................... 701/2; 701/24; 244/17.13

(58) Field of Classification Search ....................... None
See application file for complete search history.

(56) References Cited

U.S. PATENT DOCUMENTS

| | | | |
|---|---|---|---|
| 6,270,038 B1 | 8/2001 | Cycon et al. | |
| 6,588,701 B2 * | 7/2003 | Yavnai | 244/23 A |
| 6,592,071 B2 | 7/2003 | Kinkead et al. | |
| 6,694,228 B2 | 2/2004 | Rios | |
| 2002/0099481 A1 | 7/2002 | Mori | |
| 2003/0060943 A1 | 3/2003 | Carroll | |
| 2004/0129828 A1 | 7/2004 | Bostan | |
| 2006/0049304 A1 | 3/2006 | Sanders, Jr. et al. | |
| 2006/0271251 A1 * | 11/2006 | Hopkins | 701/23 |
| 2007/0093945 A1 * | 4/2007 | Grzywna et al. | 701/23 |
| 2007/0246610 A1 * | 10/2007 | Rath et al. | 244/189 |
| 2007/0284474 A1 * | 12/2007 | Olson et al. | 244/10 |

* cited by examiner

*Primary Examiner*—Michael J. Zanelli
(74) *Attorney, Agent, or Firm*—Brooks, Cameron & Huebsch, PLLC

(57) ABSTRACT

An unmanned vehicle (UV) embodiment can include a motor for movement of the UV in at least two dimensions, a receiver mechanism for receiving communication from the control station, a control unit for controlling the actuation of the motor, and memory having instructions stored thereon and executable by the control unit to, utilize environmental information to maintain the UV in a stable position and to move the UV according to control information received from the control station.

37 Claims, 4 Drawing Sheets

CONTROLLING MOVEMENT OF AN UNMANNED VEHICLE

FIELD OF THE DISCLOSURE

The present disclosure relates to controlling movement of vehicles. In particular, the present disclosure relates to controlling movement of one or more unmanned vehicles.

BACKGROUND

Some vehicles can be controlled from within a vehicle, such as the driver of a car or pilot of a plane. Some vehicles can be controlled remotely, such as by an individual with a remote control associated with an unmanned vehicle such as aircraft, spacecraft, land craft, water craft, or submarine, among other types of vehicles. In some situations, these unmanned vehicles can be beneficial.

For example, in some situations, the vehicle may be too small for an individual and/or the control equipment to fit within the vehicle. Further, in some instances, the individual and/or control equipment may be too heavy.

Unmanned vehicles (UV) may be used, for example, in situations where it is desirable to keep an individual out of harm's way. For instance, it may be useful for military and/or law enforcement personnel to enter buildings and/or other enclosed structures and/or spaces without the risk of harm to the personnel.

Entry into such structures or spaces may be desirable for various reasons. For instance, it may be desirable to search the interior of a structure, to provide surveillance and/or reconnaissance, to apprehend individuals, or fire on targets within such structures or spaces.

Such vehicles also may have access in manners that are not available to the personnel. For example, an unmanned aerial vehicle (UAV) can enter a structure on a floor above the ground level. In such instances, defenses may not be implemented based upon such a mode of entry or may be less than at other entry points, among other benefits.

Another example of the benefits of certain types of unmanned vehicles may be the ability of a submarine type vehicle to navigate under water for potentially much longer than a person may be able to. Unmanned vehicles also may be able to navigate through tighter spaces, in some instances.

However, in many unmanned vehicles, the vehicles are controlled in a manner similar to a full scale version of the vehicle. For example, if the vehicle is a helicopter, the controls may include pitch, roll, yaw, and various speed controls, among other control functionality.

Although such designs can be very responsive, the user in control of the vehicle often has to be specially trained to control the vehicle and, in some instances, even those skilled at controlling full sized vehicles, may not have the skills that are applicable to controlling such vehicles. In addition to the training taking time for the user to learn the skills to control the vehicle, it may be that the individual that is to control the vehicle is located in a remote location and cannot be trained because the user is inaccessible. As such, since there are likely to be few trained personnel, the vehicles cannot be implemented in the field very efficiently in some instances because the trained user has to be available at the location of the remote controller and therefore, the logistics of making the system operation become more complex with the logistics of providing the correct personnel.

Further, in many devices, the positioning and/or navigation of the vehicle is accomplished in whole or in part with Global Positioning System (GPS) information. However, when navigating in a building, cave, or other covered or multi-level structure, navigation using GPS can be ineffective, because the GPS signal may not transmit through the structure and/or the GPS equipped device cannot identify what level of the multi-level structure it is on, with certainty.

SUMMARY

The present disclosure includes vehicle, system, control station, and method embodiments. Unmanned vehicle embodiments of the present disclosure can be suitable, for example, for a number of different tasks, including control, surveillance, reconnaissance, communication, and/or other tasks without exposing personnel to dangerous situations, among other benefits. In the various embodiments of the present disclosure, some embodiments provide a display with functional benefits for movement, navigation, and/or option selection, among other features.

In some embodiments, a control unit associated with the vehicle can be designed to maintain the stability of the vehicle (e.g., with respect to the velocity of the vehicle). Such embodiments can be utilized in systems where a user can control the movement of the vehicle and a control unit associated with the vehicle can handle the stability of the vehicle. In embodiments where the stability of the vehicle is maintained with respect to the velocity of the vehicle, the velocity can be calculated based upon on or more factors including, measured velocity, acceleration, and/or position.

In some such embodiments, the vehicle can be designed such that the vehicle's movement emulates the movement of an individual (e.g., a first person shooter). In this manner, the individual that is remotely moving the vehicle can have a view on the display as if the individual were actually in the position of the vehicle. This can be beneficial in that the individual can see the area from a perspective that they are comfortable with and the movements of the vehicle can be intuitive to the individual.

In some embodiments, the movements of the vehicle can be at least partially self aware (i.e., the vehicle has information relating to objects around it and based upon a number of rule statements, will act or not act when an individual gives the vehicle an instruction). For example, memory can include one or more instruction statements executable by a controller that prohibit the vehicle from hitting another object. In some such embodiments, the vehicle can over-ride an instruction from the individual controlling the vehicle.

This self awareness can be accomplished by tracking the proximity of the vehicle to various objects and actuating the motors of the vehicle to keep the vehicle at a predetermined distance from the objects. Any suitable rule can be provided for through use of one or more executable instructions.

Another rule statement can, for example, be the height at which the vehicle is stabilized above the surface over which it is hovering. This can enable the vehicle to maintain a substantially constant height which gives the individual a feeling like the vehicle is moving like the individual would. In some embodiments, the height may be customizable, so that vehicle can emulate the height of the individual operating the vehicle.

Rule statements can also include rules of engagement. For example, the vehicle will not proceed past an opening in a wall without taking one or more visual images of the viewable area of the opening. Any suitable rule of engagement can be provided for through use of one or more executable instructions.

In some UV embodiments, the UV can include a number of motors for movement of the UV in one or more dimensions.

In such embodiments, the vehicle can, therefore, maneuver on various types of terrain. In some embodiments, the vehicle can move in more than two dimensions, such in helicopters, aircraft, spacecraft, submarines, and other vehicles that can utilize such functionality.

In operation, vehicle and control station embodiments can be designed to communicate information, for example, to direct the movement of the vehicle and provide feedback to the control station. The vehicle can include a receiver mechanism for receiving communication from the control station. For example, the receiver mechanism can be a receiver or transceiver suitable for receiving RF and/or other types of transmissions that may be suitable for communicating between the vehicle and the control station.

Vehicles can include a control unit for controlling the actuation of the one or more motors. For example, vehicle can include logic circuitry (e.g., one or more processors and/or application specific integrated circuits (ASIC)).

The vehicle can also include memory, in some embodiments. The memory can store a variety of information and can be used for storing any suitable information. For example, the memory can include instructions stored thereon and executable by the control unit. Some examples of the types of instructions are discussed in more detail below.

In some embodiments, memory and/or logic may be provided off the vehicle and information can be transmitted to and from the vehicle to be processed and instructions to be sent to the various components of the vehicle. Such embodiments can be beneficial, for example, in instances where a device may be captured or lost. In such instances, the device does not have any information stored therein with respect to the operation of the vehicle and/or the information collected by the vehicle.

Instructions can be used by the vehicle to provide a variety of functions. For example, instructions can be provided to control the movement of the vehicle based upon, control information from a control station. This control information can, for example, be provided by a user through one or more user control interfaces.

Instructions can be provided, in some embodiments, based upon a combination of control information from the control station and stability information provided by the control unit associated with the vehicle. In such embodiments, the stability instructions for the vehicle can be determined by the control unit based upon the stability information and the movement instructions for the vehicle can be provided by the control information.

In some embodiments, instructions can be provided based upon environmental information about the environment that the vehicle is operating in and/or is moving toward. This information can be used in generating control and/or stability instructions.

Such environmental information can be collected and/or provided in any suitable manner. For instance, the vehicle can include a number of sensors that can be provided to sense a number of environmental conditions. The information can also come from information that has been previously collected and stored in the memory of the vehicle, the control station, or elsewhere. This information can be processed and used for a variety of purposes (e.g., control of the vehicle, feedback to the user controlling the vehicle, surveillance, and/or reconnaissance).

In various embodiments, for example, the unmanned vehicle can include one or more sensors, such as a compass, an altimeter, a barometer, an airspeed indicator, a vertical speed indicator, a horizontal speed indicator, a velocity made good indicator, a global positioning sensing component, a gyroscope, a roll sensor, a yaw sensor, a pitch sensor, a bank sensor, a temperature sensor, a humidity sensor, a vibration sensor, a sideslip indicator, an attitude sensor, an inertial sensor, and/or a pressure sensor, among other sensor types. Such sensors can be chosen based upon the type of vehicle and/or the environmental conditions that may be anticipated to be encountered by the vehicle. For example, a submarine may have different types of sensors than an UAV.

As stated above, the types of instructions that can be implemented by the vehicle can include, for example, user initiated control instructions and stability control instructions (e.g., instructions regarding how to maintain the stability of the vehicle). For instance, the instructions executable on a control unit associated with a vehicle can include instructions for stabilizing a yaw, pitch, altitude, attitude, and/or roll of the UV, among other positioning and/or orientation related instructions. Instructions can be used to maintain the UV's stable position and/or in the movement of the UV based upon environmental information, such as that obtained by one or more sensors provided on the vehicle.

In various embodiments, the control unit associated with the vehicle can be designed to calculate changes to maintain the stability of the vehicle and generate instructions for accomplishing such stabilization. Such embodiments can be designed to provide this functionality automatically. This can be accomplished by actuating one or more motors on the vehicle to change the position and/or orientation of the vehicle.

In some embodiments, the movement of the vehicle can be maintained with respect to the six degrees of freedom. The six degrees of freedom are X, Y, and Z axial directions as well as roll, pitch, and yaw. Such embodiments can be advantageous because they allow the position of the vehicle to be precisely maintained in all aspects of movement.

For example, in embodiments where the vehicle provides the user with a first person point of view, the viewer would be aided if the view was stabile in the six degrees of freedom. Such stability can be accomplished through use of information obtained by a number of different sensors, which can be provided on the vehicle. Such sensors are known to those skilled in the art.

Such embodiments can be beneficial because the user does not have to control the stability of the vehicle and can focus on the movement of the vehicle, among other benefits. This can make training and/or operation of the vehicle less complex.

In some embodiments, the vehicle can include a transmitter mechanism for communicating with a control station. The transmitter mechanism (e.g., a transmitter or transceiver) can, for example, be used to transmit positioning information to the control station.

In various embodiments, the positioning information can be used by a logic circuitry (e.g., a processor) and instructions stored in memory and executable by the circuitry, for example, to alter a visual representation of a field of view that is viewed by an individual at the control station, among other functions. As stated above, the logic circuitry and/or memory can be provided in the vehicle, the control station, or elsewhere.

In various embodiments, the transmitter mechanism can be used to transmit image data (e.g., still image and/or video image) to the control station. This information can be beneficial for control, surveillance, and/or reconnaissance, among other purposes.

As stated above, the present disclosure includes a number of system embodiments. For example, in some system embodiments, a system for controlling an unmanned vehicle (UV) can include a control station having a transmitter mechanism for transmitting control information to the UV.

In such embodiments, the UV can, for example, include a motor for movement of the UV, a receiver mechanism for receiving the instructions from the control station, a control unit for controlling the actuation of the motor, and memory having instructions stored thereon and executable by the control unit to utilize environmental information to maintain the UV in a stable position, and move the UV according to the control information received from the control station. The UV of such systems can also be one of the embodiments discussed herein.

In various embodiments, the vehicle can be controlled remotely by a user through use of a control station. The control station can be any suitable control device, such as a lap top computer, desk top computer, mainframe computer, or a personal data device, among other devices. Such devices can include networked computing devices.

In addition, the vehicle can send environmental and/or positional information back to the control station relating to the task being performed. This information can be used for a variety of purposes including aiding in the navigation and/or movement of the vehicle, surveillance, and/or reconnaissance, among other purposes.

As discussed above, the vehicle can also be moved through use of control information. For example, control information can be provided through user input from a number of user control interface components (e.g., game controllers, keyboards, mouse, touch pad, touch screens) associated with the control station. Control information can be used to move the vehicle as opposed to stability information that is used to stabilize the vehicle position and/or orientation with respect to its surroundings.

As used herein, orientation can generally be viewed as movements in non-XYZ axis directions and position be used viewed as movements in XYZ axial directions. For example, the position of the vehicle can be moved to a new position within a structure, while the orientation of the vehicle may be such that the left side of the vehicle is lower than the right side and therefore a change in the orientation of the vehicle may be made to make the left and right sides of the vehicle the same height above a surface (e.g., the ground).

Additionally, in order to keep the concepts clearer herein, movement is generally used to describe a change in position of the vehicle within a structure and orientation is used to describe changes in orientation of the vehicle as described above. In various embodiments, a user can move the vehicle by providing instructions such as forward, backward, left, and right positional movements.

In some embodiments, the user can also, or alternatively, provide instructions for movements, such as rotate left and/or rotate right positional movements. In such embodiments, by limiting the types of movements available to the user, the operation of the vehicle can allow users with less training operate the vehicle, among other advantages.

Positional information can include a variety of different types of information. For example, in some embodiments, positional information can include information such as, position with respect to an object in an area surrounding the UV (e.g., a rock or pillar in a building), position with respect to a surface above or below the UV (e.g., ceiling or floor), attitude of the UV (e.g., orientation with respect to a horizon), position with respect to a target (e.g., human target or object of interest), and orientation with respect to a target (e.g., not facing target), among other suitable information that may be helpful to the user when operating the vehicle.

The transmitting mechanism can also be used to transmit environmental information to the control station as discussed above. In such embodiments, the environmental information can, for example, be used to aid in the controlling of the UV. This can be accomplished, for instance, by using a logic circuitry and instructions stored in memory and executable by the logic circuitry to alter a visual representation of a field of view that is viewed by an individual at the control station.

In such embodiments, the field of view can be actual video information obtained by the vehicle or earlier video taken of the area in which the vehicle is located. The video can also be a computer representation of the area.

This can be beneficial in some embodiments. For example, a computer representation can be more receptive to adding identifying symbols such as indicators for objects of interest or targets, among other benefits.

In some embodiments, environmental information can be used by a processor and instructions stored in memory and executable by the processor to alter the control information transmitted to the UV from the control station. For example, it may be that a wind is blowing across the area from left to right and, in some embodiments, the control information can be altered to account for the wind.

In various embodiments, the stability information can be used to account for the wind and, in such embodiments, therefore it may be that the control information is not modified. In such embodiments, the stability information can be utilized by the control unit associated with the vehicle to provide instructions to maintain the stability of the vehicle as discussed herein.

In some embodiments, the control station can include a user control interface for controlling the UV through interaction by an individual actuating the user control interface. For example, in some embodiments a number of game type controllers (e.g., Xbox, Playstation, Wii, joystick, among others) can be used as the user control interface. In such embodiments, the level of training for users to control the vehicle may be low because of the familiarity of such controllers with many potential users, among other benefits.

In various embodiments, a display can be used in which the display is a touch screen. In such embodiments, among the various benefits of such as system, a user may also be able to operate the system without much training since many potential users have had experience with touch screens.

In some embodiments, the user control interface can include control mechanisms for controlling movement of the UV and control of an operational functionality on the UV. Operational functionalities can include any functionality available on the vehicle that would be suitable for control by a user. For example, functionalities can include actuation of a listening functionality (e.g., for listening in on conversations or sounds in the area), actuation of a targeting functionality (e.g., for targeting and/or firing weapons), actuation of a speaker functionality (e.g., for emitting an audible sound, message, and/or warning), and actuation of a positioning functionality (e.g., GPS type positioning and/or mapping of the area).

The present disclosure also includes a number of control station embodiments. For example, in some embodiments, a control station for controlling an unmanned vehicle (UV), can include a transceiver mechanism for transmitting control information to and receiving video image information from the UV, a processor, a number of instructions stored in memory and executable on the processor to generate control information to transmit to the UV, a number of instructions to interpret control information received from the UV, and a display for viewing the video image information to aid in the movement of the UV.

As stated above, in various embodiments, the display can be a touch screen and can be used, for example, to provide a user control interface functionality for controlling the UV. The touch screen functionality can be used for any suitable function of the system. For instance, the display can provide user menu functionality to select a number of user configurable options.

Embodiments can include displays that are not touch screens and such displays can display image information, including video image information, in various embodiments. Such embodiments can also display a menu of user configurable options. In such embodiments, the selections on the menu can be made by another type of user control interface, such as a game controller, mouse, touch pad, or keyboard, among other types.

In some embodiments, the menu of user configurable options is a semi-transparent menu. Display can also be designed to allow for the display of a number of informational items overlaid on at least a portion of the image information. In some embodiments, the number of informational items overlaid on at least a portion of the image information are semi-transparent.

The embodiments of the present disclosure also include a number of method embodiments. For example, a method embodiment for controlling an unmanned vehicle (UV) can include utilizing environmental information to maintain the UV in a stable position, actuating a user control interface at a control station to generate a first control information item, transmitting the first control information item from the control station to the UV, and processing the first control information item at the control unit of the UV to identify control information to be used by the control unit to move the UV.

In some embodiments, utilizing environmental information to maintain the UV in a stable position can, for example, be accomplished by looping a set of instructions executable by a control unit (e.g., checking the orientation of the vehicle, calculating any changes to be made to the orientation, generating instructions to effectuate the changes, and checking to see that the instructions have made the changes, and beginning such a loop over again). This can be accomplished for example by providing instructions including, sensing an orientation of the UV with one or more sensors, calculating an adjustment to be made to the orientation of the UV based upon the sensed orientation, and actuating a first motor for movement of the UV. Various method embodiments can include actuating a second motor in combination with the first motor for movement of the UV.

DETAILED DESCRIPTION

Figure 1:
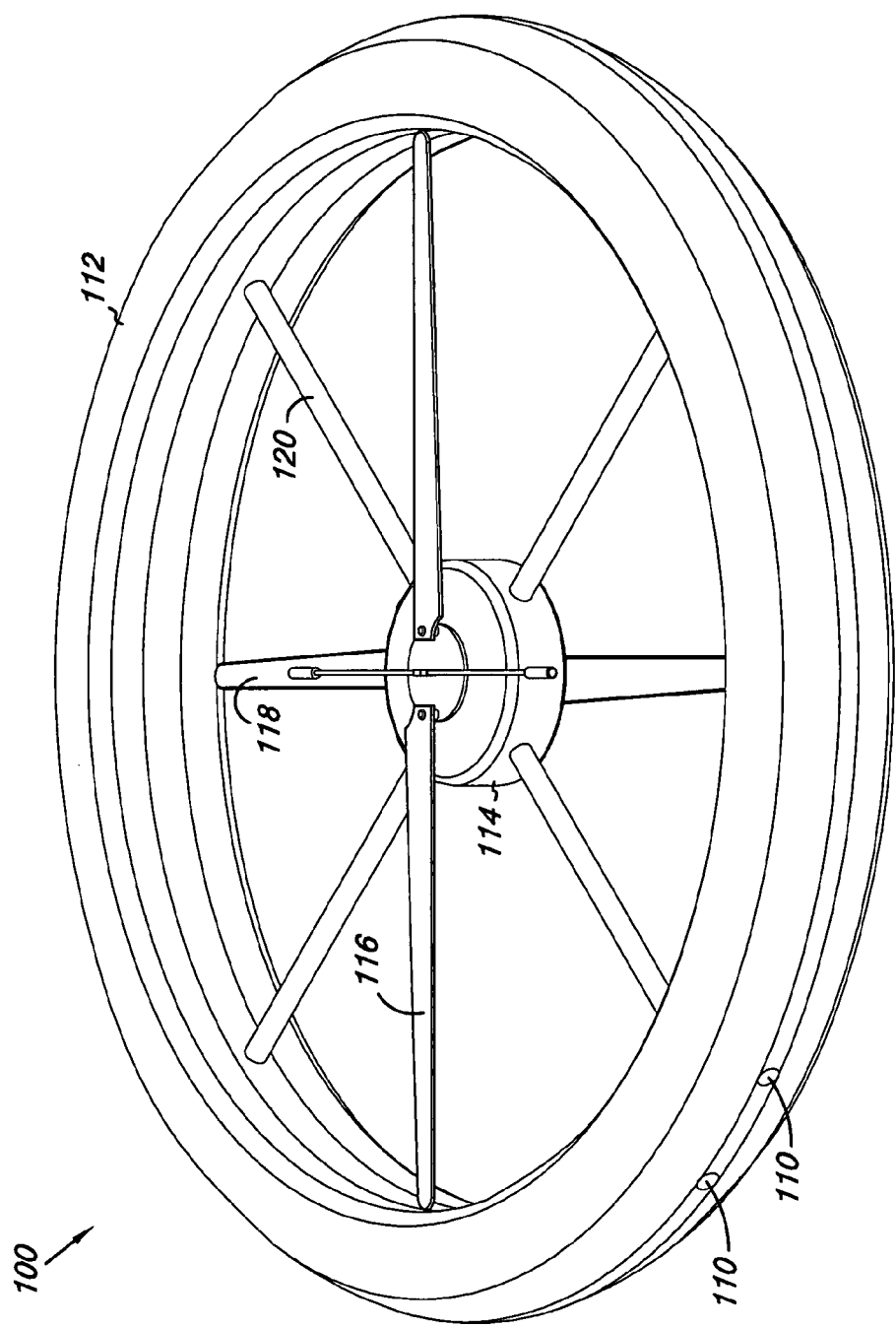
FIG. 1 is a perspective view of the unmanned aerial vehicle embodiment of the present disclosure.

The present disclosure includes a number of method, control station, vehicle, and system embodiments. Embodiments of the present disclosure will now be described in relation to the accompanying drawings, which will at least assist in illustrating various features of the various embodiments.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, and/or eliminated so as to provide a number of additional embodiments. In addition, discussion of features and/or attributes for an element with respect to one Figure can also apply to the element shown in one or more additional Figures.

FIG. 1 is a perspective view of the unmanned aerial vehicle embodiment of the present disclosure. In the embodiment of FIG. 1, the UAV 100 includes a set of counter-rotating rotors that are driven by motors. Such vehicles can be particularly useful for entering buildings and other enclosed structures or spaces, such as caves and the like. The UAV 100 can also be equipped for potential offensive or defensive actions with one or more weapons or defense measures mounted thereon.

The UAV 100 includes a non-rotating body 112, a non-rotating hub 114, first and second bladed rotors 116, 118, and a non-rotating frame 120 that connects the body 112 to the hub 114.

In the embodiment of FIG. 1, the UAV 100 can be designed such that the first and second rotors 116, 118 counter-rotate within and relative to the body 112 so that the rotation direction of the first rotor 116 is opposite to the rotation direction of the second rotor 118. The first rotor 116 can be mounted at the top of the hub 114 and the second rotor 118 can be mounted at the bottom of the hub 114 so that the first rotor 116 acts as an upper or top rotor while the second rotor 118 acts as a lower or bottom rotor.

The body 112 and/or hub 114 can house a number of components therein. For example, in the embodiment of FIG. 1, the hub 114 rotatably supports the rotors 116, 118, and can include a generally hollow interior in which a number of motors (e.g., electric) for driving the rotors 116, 118 can be disposed. The motors can be positioned in driving engagement with the rotors 116, 118 through respective suitable drive mechanisms.

The body 112 and/or hub 114 can also house logic circuitry (e.g., processor, ASIC) and/or memory, and a number of transmission and/or reception mechanisms (e.g., transmitter, receiver, and/or transceiver) therein. The body 112 and/or hub 114 can also house a power source for the one or more motors, such as a battery, fuel cell, or other power source.

The body 112 and/or hub 114 can house a control unit, for example various logic circuitry and/or electronics, used to control the vehicle 100's flight and operations. In some embodiments, the body 112 and/or hub 114 can house a suitable payload that can provide various functions with respect to the intended use or application of the vehicle 100.

For example, the body 112 can house passive equipment such as a number of cameras 110, microphones, speakers, sensors, and/or offensive and/or defensive components, such as weapons, and the like. As stated above, the body 112 and/or hub 114 can house communications components for providing communication with a control station, such as a lap top computer.

In some embodiments, the body 112 includes a number of optic flow sensors that can be used along with an inertial measurement component for navigation of the vehicle 100.

Such sensors can also be used to help the vehicle 100 avoid collisions with objects within a structure.

The use of optical flow sensors can allow the vehicle to operate without using guidance systems such as GPS. As a result, the vehicle can be used in environments that are not suitable for GPS and other sensors or where the performance of GPS and other guidance systems may be degraded, such as in caves and buildings.

In some embodiments, a UV, such as vehicle 100, can be operated remotely by a user, for example a soldier, using a control station. To enter a building and perform reconnaissance therein, for example, the vehicle 100 can be moved (e.g., flown) by the user through a suitable access point, such as through an open door or an open window.

Through use of cameras 110 on the vehicle 100 image information (e.g., video) of the interior of the building can be provided to the user. The user can fly the vehicle 100 throughout accessible portions of the interior of the building to allow these portions of the building to be scouted.

Figure 2:
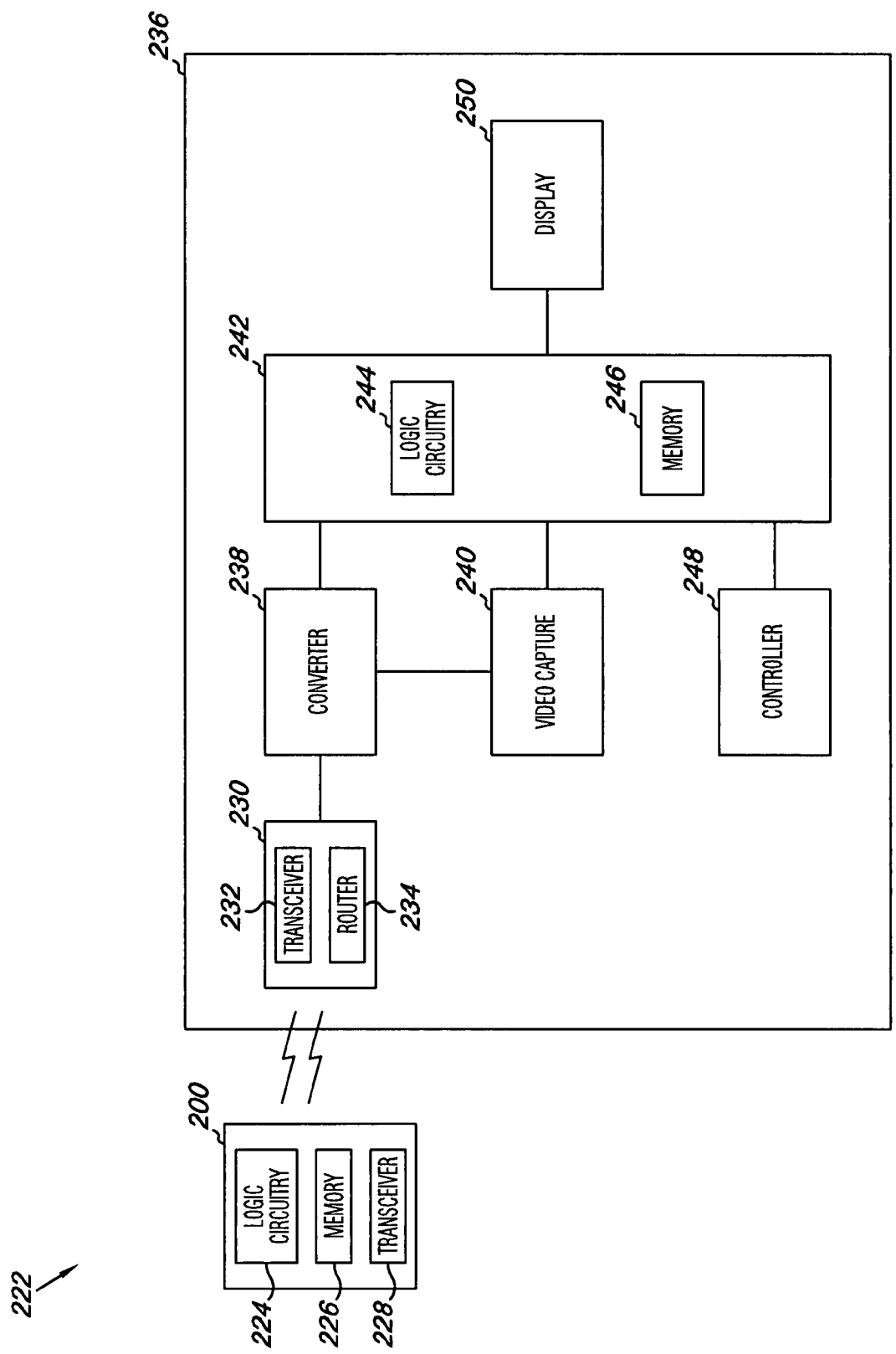
FIG. 2 is a block diagram of a system embodiment according to the present disclosure.

FIG. 2 is a block diagram of a system embodiment according to the present disclosure. Although a number of components of various devices of the system 222 are illustrated, the functionalities of the various illustrated components can be combined or split into additional components if desired.

In the embodiment of FIG. 2, the system 222 includes a UV 200 and a control station 236. The UV 200 includes logic circuitry 224, memory 226, and a transceiver 228. These components allow the UV 200 to store a variety of items thereon, including items such as stability information and/or instructions.

For example, the memory can include instructions executable on the logic circuitry (e.g., a number of processors and/or ASICs) to calculate changes to be made to the orientation of the UV 200 and/or instructions to implement such changes. For instance, the memory can include instructions for actuating the number of motors in order to achieve an appropriate change in orientation of the vehicle (e.g., motor speed or combination of speeds of multiple motors).

As stated herein, environmental information can also be used in such calculations and can also be stored in memory in some embodiments. Such information can be collected by one or more sensors on the UV or can be provided to the memory from another source, such as from the control station. Such information can be provided via a wired connection between the control station and the vehicle and/or via a wireless connection, in various embodiments.

As stated above, in some embodiments, a vehicle (e.g., UV 200) can be designed such that the vehicle's movement emulates the movement of an individual (e.g., a first person shooter). In this manner, the individual that is remotely moving the vehicle can have a view on a display as if the individual were actually in the position of the vehicle. This can be beneficial in that the individual can see the area from a perspective that they are comfortable with and the movements of the vehicle can be intuitive to the individual.

In various embodiments, the movements of the vehicle can be at least partially self aware (i.e., the vehicle has information relating to objects around it and based upon a number of rule statements, will act or not act when an individual gives the vehicle an instruction). For example, memory (e.g., memory 226) can include one or more instruction statements executable by a controller (e.g., logic circuitry 224) that prohibit the vehicle from hitting another object.

This can be accomplished, for example, by tracking the proximity of the vehicle to various objects (e.g., analyzing information relating to objects around the vehicle) and actuating the motors of the vehicle (e.g., the motors controlling the movement of rotors 116 and 118 in the embodiment of FIG. 1) to keep the vehicle at a predetermined distance from the objects. Any suitable rule can be provided for through use of one or more executable instructions.

Also as discussed above, another example of a rule statement can, for example, be the height at which the vehicle is stabilized above the surface over which it is hovering. This can enable the vehicle to maintain a substantially constant height which gives the individual a feeling like the vehicle is moving like the individual would.

Other types of movements that an individual would make can be provided through use of such instructions. For example, fast walking or running movement speeds can be provided through use of executable instructions. This can be accomplished, for example, by instructing the vehicle to move at a particular velocity when a particular instruction is received from a control station.

In such instructions sets, information from an individual's controller used to control the vehicle and/or other sensors (e.g., on the vehicle) can be used to provide more accurate movement. In some embodiments, the height may be customizable, so that vehicle can emulate the height of the individual operating the vehicle.

Rule statements can also include rules of engagement. For example, the vehicle will not proceed past an opening in a wall without taking one or more visual images of the viewable area of the opening. Any suitable rule of engagement can be provided for through use of one or more executable instructions.

The control station 236 of the embodiment of FIG. 2 also includes a number of components, including a transmission and reception mechanism 230, a converter 238, a video capture component 240, a processing component 242, a display component 250, and a user control interface (i.e., controller) 248.

In the embodiment of FIG. 2, the transmission and reception mechanism 230 includes a transceiver 232 and a router 234. In such embodiments, the transceiver sends and receives information to and from the UV 200.

The router 234 sends and receives information to and from the converter 238. In some embodiments, such as that shown in FIG. 2, a converter 238 can be used to convert a received signal into a number of different components, such as a video stream, image data, and/or other information received from the UV 200. This information can be parsed out to one or more components of the control station 236, such as to the video capture component 240 and/or the processing component 242.

In some embodiments, the converter can also convert information to be sent to the UV 200 from such components of the control station. Additionally, some embodiments may not utilize a converter and may pass information to and from the other components of the control station.

In some embodiments, such as that illustrated in FIG. 2, the control station can include a video capture component 240. The video capture component can be used to receive video information from the transmission and reception mechanism 230 or converter 238 and prepare the information for display on the display 250.

In some embodiments, the video capture component 240 can be a TV tuner that can take a NTSC (National Television System(s) Committee) video signal and can present it as a captured video on the display 250 via instructions from the processing component 242 (e.g., stored in memory 246 and executable on logic circuitry 244). Any other type of video signal can be used, such as PAL (phase-alternating line) and SECAM (sequential color with memory) signal types, among others.

As discussed herein, the user control interface 248 can be one or more of any suitable control components for allowing a user to provide input into the control station. Some suitable user control interface components include game controllers, mouse, touch pads, or keyboards, among other component types.

Figure 3A:
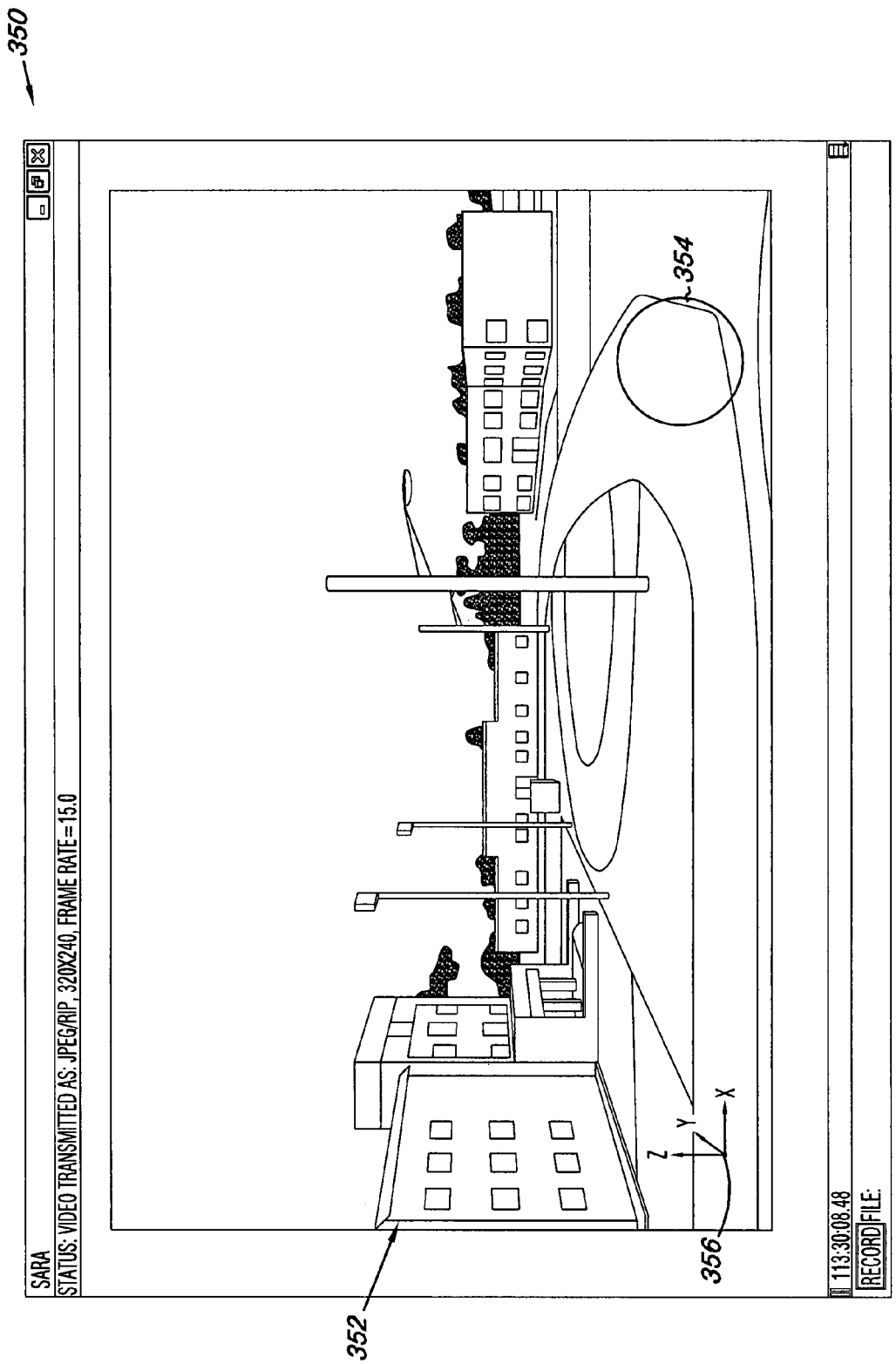
FIG. 3A is a display according to an embodiment of the present disclosure.

FIG. 3A is a display according to an embodiment of the present disclosure. In the embodiment of FIG. 3A, the display includes a visual depiction 352 of the area in which the UV (e.g., UV 200 of FIG. 2) is operating.

Such depictions can be generated from a variety of sources. For example, video and/or image information obtained from the UV or previous obtained information (e.g., obtained from another vehicle, satellite, or observer) can be used to generate the depiction.

In some embodiments, the depiction can be a live view of the area. In some embodiments, the view can be a computer generated depiction or a combination of live and computerized elements. Live type views can be beneficial in providing a live view as if viewed from the vehicle itself and, therefore, the user can be remotely located, but move the vehicle as if the user was the vehicle or within the vehicle.

Additionally, when used with an embodiment that utilizes a UV having stability functionality, the movement of the vehicle can be made such that a user can indicate a forward movement with a user control interface (e.g., moving a joystick forward) and if the user control interface neutralizes the interface (e.g., releases the joystick such that it returns to its neutral position) the stability functionality of the UV can stabilize the orientation of the vehicle such that it maintains its position in anticipation of the next movement indicated by the user via a user control interface. With such systems, the user can have a low level of training because the movement of the vehicle is similar to the movement of their own body (e.g., a quick press forward and release of the joystick and the vehicle can move a short distance forward and stop).

In various embodiments, as discussed above, the movements indicated by the user can be in terms of XYZ axis movements 356. This type of movement can be beneficial in some instances, since the movement of the UV may be easier for a user to control and/or understand.

The embodiment of FIG. 3A also includes an area 354 for the presentation of information that may be relevant to the user while operating the vehicle. The area can, for example, include a list of functions that are available on the vehicle (targeting, listening, speaking, viewing, object location, etc.).

In such embodiments, the user can make selections from the information present without having to stop navigating the vehicle. This can be beneficial, for example, when the vehicle is moving through a hostile area, where, if a user stops viewing the navigation of the vehicle, the vehicle may be destroyed when the user returns to the navigation view.

In some embodiments, the area 354 can be semi-transparent, such that the user can see the image area behind the area 354. This can be beneficial, for example, in instances where a target may appear in the area while information is being presented in the area 354. In such instances, the target may see the vehicle and escape or destroy the vehicle without the user seeing that activity.

Figure 3B:
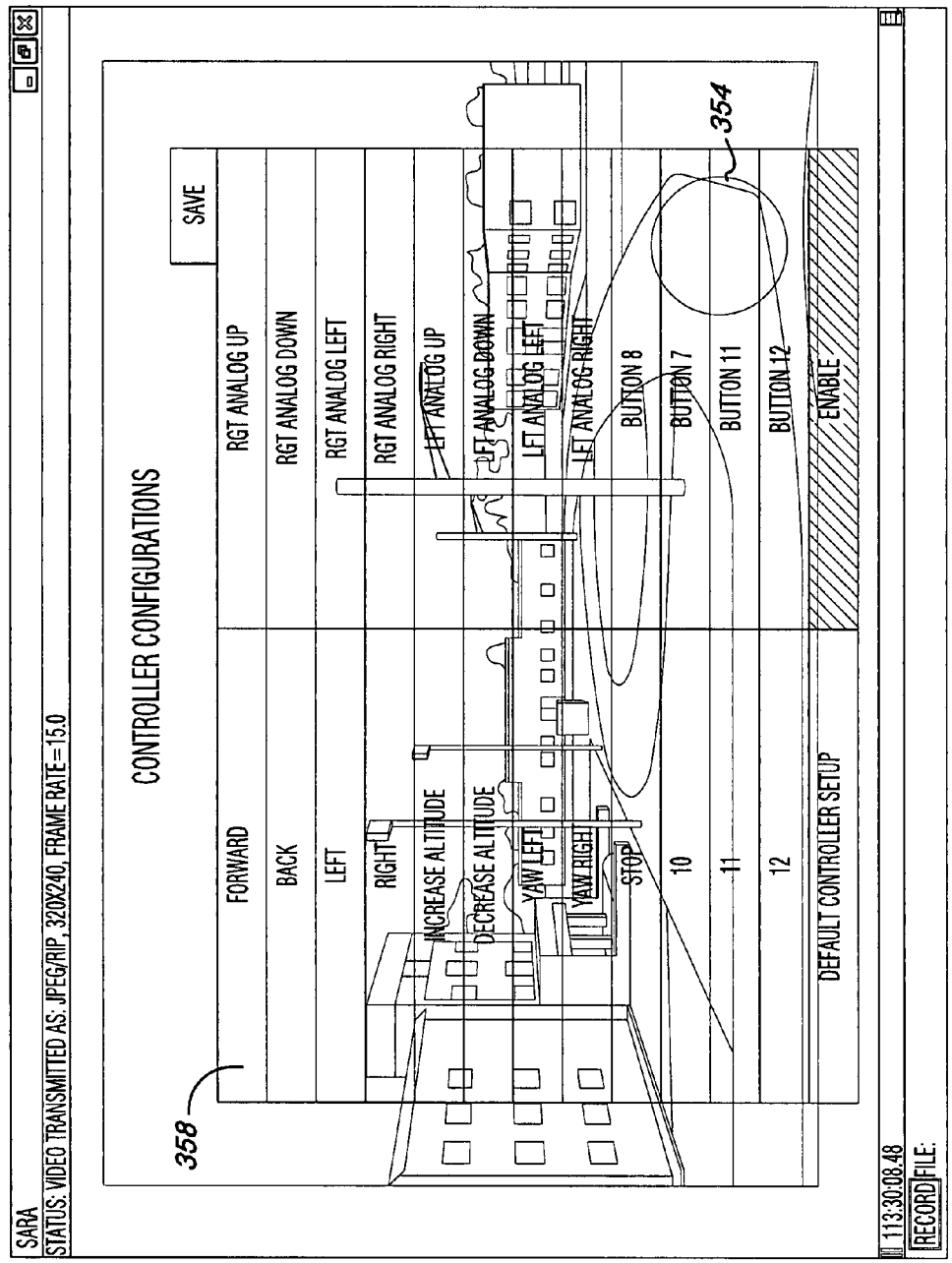
FIG. 3B is a display according to another embodiment of the present disclosure.

FIG. 3B is a display according to another embodiment of the present disclosure. In the embodiment of FIG. 3b, the display 350 depicts a larger information screen 358 overlaid on the image (e.g., image 352 of FIG. 3A). The information screen 358 includes a number of user selectable items 360. In various embodiments, the control station can provide various types of user selectable information to the user. For example, user selectable information can include control station configuration options, user control interface configuration options, display configuration options, overlay options, vehicle/control station communication options, and/or vehicle configuration options, among other types of information.

In some embodiments, such information can be presented in a semi-transparent manner. Such embodiments can provide similar benefits as those discussed above with respect to area 354 of FIG. 3A. As illustrated in the embodiment of FIG. 3B, in some embodiments, the levels of transparency can be different for area 354 and 358, such that both types of information can be viewed and/or such that a user can see through both overlaid items to the image.

As a result, the user can determine whether the building is occupied, how many occupants there are, where in the building the occupants are located, among other tasks. In addition, the user can move the vehicle to search for weapons, explosive devices, and/or other potential dangers prior to entering the building.

Although specific embodiments have been illustrated and described herein, those of ordinary skill in the art will appreciate that any arrangement calculated to achieve the same techniques can be substituted for the specific embodiments shown. This disclosure is intended to cover adaptations or variations of various embodiments of the present disclosure. It is to be understood that the above description has been made in an illustrative fashion, and not a restrictive one.

Combination of the above embodiments, and other embodiments not specifically described herein will be apparent to those of ordinary skill in the art upon reviewing the above description. The scope of the various embodiments of the present disclosure includes various other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim.

Rather, as the following claims reflect, inventive subject matter may lie in less than all features of a single disclosed embodiment. Thus, the following claims are hereby incorporated into the Detailed Description, with each claim standing on its own as a separate embodiment.

The invention claimed is:

1. An unmanned vehicle (UV), comprising:
   a motor for movement of the UV in at least two dimensions;
   a receiver mechanism for receiving communication from a control station;
   a control unit for controlling the actuation of the motor; and
   memory having instructions stored thereon and executable by the control unit to:
   utilize environmental information to maintain the UV in a stable position with respect to a velocity of the UV and to move the UV according to control information received from the control station that includes a transmitter mechanism for transmitting control information to the UV, where the control information includes forward, backward, left, and right positional movements.

2. The unmanned vehicle according to claim 1, where the instructions executable on the control unit include instructions for stabilizing a yaw of the UV.

3. The unmanned vehicle according to claim 1, where the UV further includes one or more sensors for sensing and providing environmental information to be used in maintaining the UV's stable position and in the movement of the UV.

4. The unmanned vehicle according to claim 3, where the environmental information allows the control unit to maintain the UV in a stable position with respect to the six degrees of freedom.

5. The unmanned vehicle according to claim 3, where the instructions executable on the control unit include instructions for stabilizing an altitude of the UV.

6. The unmanned vehicle according to claim 1, where the UV includes a transmitter mechanism for communicating with the control station.

7. The unmanned vehicle according to claim 6, where the transmitter mechanism transmits positioning information to the control station.

8. The unmanned vehicle according to claim 6, where the transmitter mechanism transmits image data from a sensor on the UV to the control station.

9. The unmanned vehicle according to claim 1, where the instructions executable on the control unit include instructions for stabilizing a pitch of the UV.

10. A system for controlling an unmanned vehicle (UV), comprising:
    a control station including a transmitter mechanism for transmitting control information to the UV;
    the UV, including:
      a motor for movement of the UV;
      a receiver mechanism for receiving the instructions from the control station;
      a control unit for controlling the actuation of the motor; and
      memory having instructions stored thereon and executable by the control unit to:
        utilize environmental information to maintain the UV in a stable position; and
        move the UV according to the control information received from the control station, where the control information includes forward, backward, left, and right positional movements.

11. The system according to claim 10, where the control information further includes rotate left, and rotate right positional movements.

12. The system according to claim 10, where the UV has a transmitter for transmitting positional information to the control station.

13. The system according to claim 12, where the positional information is used by a control station processor and instruction stored in memory and executable by the control station processor to alter a visual representation of a field of view that is viewed by an individual at the control station.

14. The system according to claim 12, where the positional information includes information selected from the group including:
    position with respect to an object in an area surrounding the UV;
    position with respect to a surface below the UV;
    attitude of the UV;
    position with respect to a target; and
    orientation with respect to a target.

15. The system according to claim 10, where the UV has a transmitter for transmitting environmental information to the control station.

16. The system according to claim 15, where the environmental information is used to aid in the controlling of the UV.

17. The system according to claim 16, where the environmental information is used by a control station processor and instructions stored in memory and executable by the control station processor to alter a visual representation of a field of view that is viewed by an individual at the control station.

18. The system according to claim 16, where the environmental information is used by a control station processor and instructions stored in memory and executable by the control station processor to alter the control information transmitted to the UV from the control station.

19. The system according to claim 10, where the control station includes a user control interface for controlling the UV through interaction by an individual moving the user control interface.

20. The system according to claim 19, where the user control interface includes control mechanisms for controlling movement of the UV and control of an operational functionality on the UV.

21. The system according to claim 20, where the user control interface includes control mechanisms for controlling movement of the UV and control of an operational functionality selected from the group including:
    actuation of a listening functionality;
    actuation of a targeting functionality;
    actuation of a speaker functionality; and
    actuation of a positioning functionality.

22. A control station for controlling an unmanned vehicle (UV), comprising:
    a transceiver mechanism for transmitting control information to and receiving video image information from the UV;
    a logic circuit;
    a number of instructions stored in memory and executable on the logic circuit to generate control information to transmit to the UV;
    a number of instructions stored in memory and executable on the logic circuit to interpret control information received from the UV; and
    a display for viewing the video image information to aid in the movement of the UV, where the display includes a menu of user configurable options.

23. The control station according to claim 22, where the display is a touch screen and provides a user control interface functionality for controlling the UV.

24. The control station according to claim 22, where the display is a touch screen and provides user menu functionality to select a number of user configurable options.

25. The control station according to claim 22, where the menu of user configurable options is at least a semi-transparent menu.

26. The control station according to claim 22, where the display includes a number of informational items overlaid on at least a portion of the video image information.

27. The control station according to claim 26, where the number of informational items overlaid on at least a portion of the video image information are at least semi-transparent.

28. An unmanned vehicle (UV), comprising:
    a motor for movement of the UV in at least two dimensions;
    a receiver mechanism for receiving communication associated with controlling movement of the UV from a control station;
    a control unit for controlling the actuation of the motor; and
    memory having instructions stored thereon and executable by the control unit to:

move the UV according to the control information received from the control station, where the control information includes forward, backward, left, and right positional movements; and utilize environmental information to emulate the movement of an individual.

29. The unmanned vehicle according to claim 28, where the vehicle includes memory having instructions stored thereon and executable by the control unit to:

analyze information relating to objects around the UV and based upon a number of rule statements, act or not act, when an individual a user gives the UV an instruction.

30. The unmanned vehicle according to claim 28, where the vehicle includes memory having instructions stored thereon and executable by the control unit to:

prohibit the vehicle from hitting an object.

31. The unmanned vehicle according to claim 28, where the vehicle includes memory having instructions stored thereon and executable by the control unit to:

track the proximity of the UV to an object and actuate the motor of the UV to keep the UV at a predetermined distance from the object.

32. The unmanned vehicle according to claim 28, where the vehicle includes memory having instructions stored thereon and executable by the control unit to:

maintain a substantially constant height above a surface the UV is positioned.

33. The unmanned vehicle according to claim 28, where the vehicle includes memory having instructions stored thereon and executable by the control unit to:

move the UV at a particular velocity when a particular instruction is received from a the control station.

34. The unmanned vehicle according to claim 28, where the vehicle includes memory having instructions stored thereon and executable by the control unit to:

access in a predetermined rule of engagement statement in memory and follow the predetermined rule of engagement statement.

35. A method for controlling an unmanned vehicle (UV), comprising:

utilizing environmental information to maintain the UV in a stable position by looping a set of instructions executable by a control unit;

actuating a user control interface at a control station to generate a first control information item;

transmitting the first control information item from the control station to the UV;

processing the first control information item at the control unit of the UV to identify control information to be used by the control unit to move the UV, where the UV includes:

a motor for movement of the UV in at least two dimensions;

a receiver mechanism for receiving communication from the control station;

a control unit far controlling the actuation of the motor; and memory having instructions stored thereon and executable by the control unit to:

move the UV according to the control information received from the control station, where the control information includes forward, backward, left, and right positional movements.

36. The method of claim 35, where utilizing environment information to maintain the UV in a stable position by looping the set of instructions executable by the control unit includes:

sensing an orientation of the UV with one or more sensors;

calculating an adjustment to be made to the orientation of the UV based upon the sensed orientation; and actuating a first motor for movement of the UV.

37. The method of claim 36, where the method includes actuating a second motor in combination with the first motor for movement of the UV.

* * * * *